United States Patent
Saxena et al.

(10) Patent No.: US 11,546,833 B2
(45) Date of Patent: Jan. 3, 2023

(54) CONTROLLING EQUIPMENT ACCESS TO SLICES IN A 5G NETWORK

(71) Applicant: Hewlett Packard Enterprise Development LP, Houston, TX (US)

(72) Inventors: Ravi Saxena, Karnataka (IN); John O'Connell, Uriage-les-Bains (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/205,565

(22) Filed: Mar. 18, 2021

(65) Prior Publication Data

US 2022/0078696 A1 Mar. 10, 2022

(30) Foreign Application Priority Data

Sep. 9, 2020 (EP) .................................... 20305995

(51) Int. Cl.
*H04W 48/02* (2009.01)
*H04W 4/60* (2018.01)
(Continued)

(52) U.S. Cl.
CPC ............. *H04W 48/02* (2013.01); *H04W 4/60* (2018.02); *H04W 8/08* (2013.01); *H04W 8/18* (2013.01);
(Continued)

(58) Field of Classification Search
CPC ......... H04W 48/02; H04W 4/60; H04W 8/08; H04W 8/18; H04W 8/22; H04W 12/08;
(Continued)

(56) References Cited

U.S. PATENT DOCUMENTS

| | | | |
|---|---|---|---|
| 9,985,799 B2 | 5/2018 | White et al. | |
| 2017/0164212 A1* | 6/2017 | Opsenica | ................ G06F 16/41 |

(Continued)

FOREIGN PATENT DOCUMENTS

| | | |
|---|---|---|
| WO | 2019/222604 A1 | 11/2019 |
| WO | 2020/074542 A1 | 4/2020 |

OTHER PUBLICATIONS

Afolabi, Ibrahim, et al. "Network slicing and softwarization: A survey on principles, enabling technologies, and solutions." IEEE Communications Surveys & Tutorials 20.3 (2018): 2429-2453. (Year: 2018).*

(Continued)

*Primary Examiner* — Sharad Rampuria
(74) *Attorney, Agent, or Firm* — Sheppard Mullin Richter & Hampton LLP

(57) ABSTRACT

5G introduces the concept of network slices. Although the 5G standard contemplates some form of slice access control, it is premised on subscriber identity-based checks. Because subscriber identities are associated with/maintained via subscriber identity module (SIM) cards, and because SIM cards can be swapped from one device (user equipment) to another, slice access control based on subscriber identities can fail to prevent unauthorized device access. Systems and methods are provided for enhanced slice access control vis-à-vis an enhanced access and mobility management (AMF), and equipment identity register (EIR) functions. In some embodiments, a localized EIR function can reduce latency/messaging overhead.

15 Claims, 7 Drawing Sheets

(51) Int. Cl.
  *H04W 12/30* (2021.01)
  *H04W 8/08* (2009.01)
  *H04W 8/18* (2009.01)
  *H04W 8/22* (2009.01)
  *H04W 12/08* (2021.01)

(52) U.S. Cl.
  CPC .............. *H04W 8/22* (2013.01); *H04W 12/08* (2013.01); *H04W 12/35* (2021.01)

(58) Field of Classification Search
  CPC ....... H04W 12/35; H04W 8/24; H04W 12/69; H04L 41/0893; H04L 63/0853; H04L 63/101; H04L 41/5051; H04L 47/70; H04L 47/72; H04L 47/74; H04L 47/78; H04L 47/80; H04L 47/83
  See application file for complete search history.

(56) References Cited

U.S. PATENT DOCUMENTS

| | | | |
|---|---|---|---|
| 2018/0191782 A1 | 7/2018 | Djordjevic et al. | |
| 2019/0335392 A1* | 10/2019 | Qiao | H04W 48/18 |
| 2019/0357131 A1 | 11/2019 | Sivavakeesar et al. | |
| 2020/0163008 A1 | 5/2020 | Hedman et al. | |
| 2021/0168705 A1* | 6/2021 | Fiorese | H04W 12/06 |

OTHER PUBLICATIONS

Braeken, An, et al. "Novel 5G authentication protocol to improve the resistance against active attacks and malicious serving networks." IEEE Access 7 (2019): 64040-64052. (Year: 2019).*

Behrad et al., "5G-SSAAC: Slice-specific Authentication and Access Control in 5G", IEEE Conference on Network Softwarization (NetSoft), 2019, 5 pages.

* cited by examiner

CONTROLLING EQUIPMENT ACCESS TO SLICES IN A 5G NETWORK

DESCRIPTION OF RELATED ART

Wireless devices (e.g., smart phones, tablets, and laptops) are used to send and receive data. Such data may be transmitted and received over a wireless network. 5G is a standard promulgated by the International Telecommunication Union (ITU) and the $3^{rd}$ Generation Partnership Project (3GPP), with the ITU setting the minimum requirements for 5G compliance, and the 3GPP creating the corresponding specifications. 5G is a successor to the 4G/Long Term Evolution (LTE) standard, and refers to the fifth generation of wireless broadband technology for digital cellular networks. 5G is intended to replace or augment 4G/LTE. Touted advantages of 5G include, e.g., exponentially faster data download and upload speeds, along with much-reduced latency (also referred to as "air latency," i.e., the time it takes for a device to communicate with the network). Another advantage of 5G is the introduction of network slicing, which can refer to the ability to create/operate multiple virtual networks, each designed/dedicated to a specific use case, for example.

The frequency spectrum of 5G includes three bands. The first band can be referred to as the low-band spectrum, i.e., the sub-1 GHz spectrum. This low-band spectrum is the primary band used by U.S. wireless carriers with data speeds reaching about 100 Mbps. The second band can be referred to as the mid-band spectrum, i.e., the sub-6 GHz spectrum, which provides lower latency (e.g., 4-5 ms) and greater data speeds (e.g., up to 1 Gbps) relative to the low-band spectrum. However, mid-band signals are not able to penetrate structures, such as buildings, as effectively as low-band signals. The third band can be referred to as the high-band spectrum, or millimeter wave (mmWave), and operates between 25 GHz and 100 GHz. The term millimeter is associated with this high-band spectrum because wavelengths in this portion of the spectrum range from, e.g., 1-10 mm. Devices operating on this third band can deliver the highest data speed (e.g., up to 10 Gbps) and the lowest latency (e.g., 1 ms). However, its coverage area (the distance it can transfer data) is less than that of the low-band and mid-band spectrums, due in part to poor building penetration. Use of mmWave technology may however, avoid already congested portions of the spectrum. So long as the limited coverage area is acceptable, the benefits of mmWave technology can still be realized.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
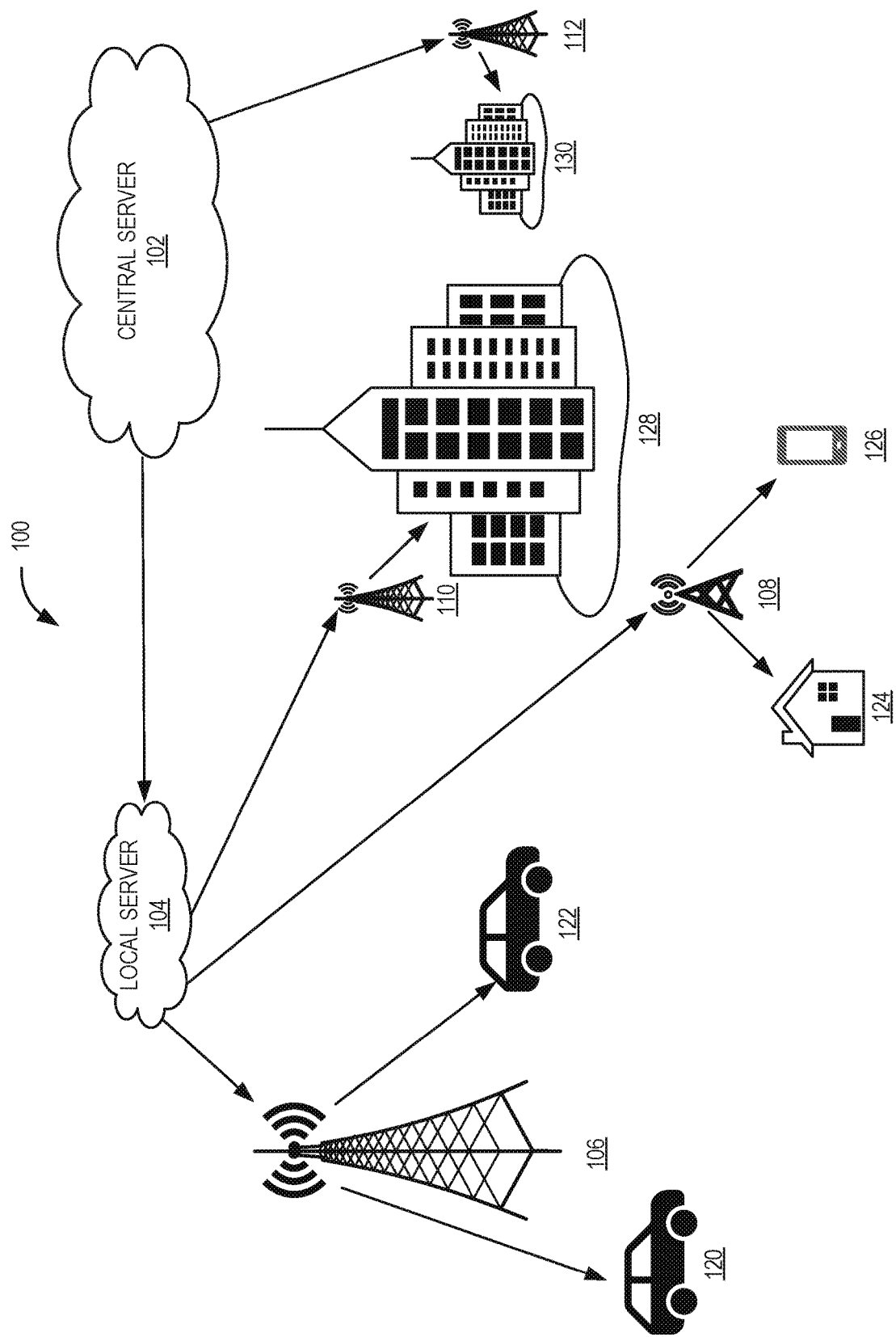
FIG. 1 illustrates an example 5G network.

The figures are not exhaustive and do not limit the present disclosure to the precise form disclosed.

DETAILED DESCRIPTION

The 5G standard introduces the concept of network slicing, which refers to the ability to create and operate multiple virtual networks, with each virtual network or network slice dedicated to a specific use case. Accordingly, a 5G network can include multiple parallel virtual networks, each supporting a particular use case or delivering services to a subset of devices. Examples of devices can include, e.g., smart meters, connected vehicles, smart phones, industrial equipment, and/or any device capable of accessing a network.

For network security and other operational reasons, the business customer or tenant of a network slice instance may wish to set forth policies which specify that only a particular type of device or only certain devices can connect to and use the network resources and services associated with that slice, and those policies should be applied by the network when a device requests access to that slice. For example, in a manufacturing environment, a policy may enable access of industrial equipment in a particular area of operation to a network slice configured for monitoring/controlling that manufacturing area of operation.

Each device or user equipment (UE) can be identified by certain identification information, e.g., its International Mobile Equipment Identity (IMEI), or its Permanent Equipment Identification (PEI), the 5G equivalent to the IMEI. Currently, the 5G standard specifies checking a subscriber's authority to access a slice vis-à-vis that subscriber's corresponding subscriber profile. An Equipment Identity Register (EIR), used to check UE status, is typically implemented as a centralized database within a network. The EIR is currently used to identify potentially stolen devices/prevent unauthorized devices from accessing a network via a deny list (also commonly referred to as a "blacklist") containing prohibited IMEIs.

Another departure from previous standards, e.g., 4G, is the decomposition of the 4G Mobility Management Entity (MME) into what in 5G, is referred to as the 5G Core Access and Mobility Management Function (AMF). The AMF may receive connection and mobility management tasks from UEs, and can handle connection and mobility management tasks, while forwarding session management tasks/messages to a Session Management Function (SMF).

Although a 5G-specific EIR and AMF have been introduced, current systems may not be able to address controlling the access to a slice by a device/UE when a subscriber identity module (SIM) card is moved to that device from another device. Currently, the right to access or connect to a slice is linked to subscriber profiles vis-à-vis the Subscription Permanent Identifier (SUPI). Additionally, for a slice that is associated with a small number of devices that are allowed access, access controls may be managed as an access list (commonly referred to as a whitelist) (rather than a deny list per the EIR). Further still, requesting authorization/authentication via the EIR results in overhead and potentially, the creation of a bottleneck at the EIR. Not to mention, for low latency use cases, response times should be minimized, and because devices are able to connect to multiple slices, device access control policies should be applied to requested slices.

Accordingly, various embodiments are directed to an AMF network function that performs local checks regarding: (1) device status (PEI/IMEI, SUPI/IMSI); (2) application of per-slice access control policies, e.g., yes/no or more fine-grained per-slice access control policies, e.g., time-based per-slice access control policies, access-level-based per-slice access control policies, etc.; and (3) slices (PEI/IMEI, list of slices). A localized/co-located EIR database or other data store may cache/keep localized copies of: (A) PEI/IMEI, SUPI/IMSI mappings; (B) lists of denylisted devices; (C) per-slice access control policies; and (D) per-slice allowlists. The local/co-located EIR database can sync with a centralized EIR network function that accesses a primary EIR database.

It should be noted that in the event that the SUPI/PEI of a UE does not match the mapping in the local/co-located EIR database, the AMF network function may not be able to apply a change to the local database. Instead, the AMF may notify the centralized EIR network function which may have exclusive authority to approve and change any mapping, before applying that change to the local instances of the database.

In some embodiments, a new network function may be created for use instead of enhancing the current 5G-EIR function, e.g., a slice control function.

In some embodiments, a new specialized certificate or identifier may be used instead of conventional PEI/IMEI and SUPI/IMSI identifiers.

Before describing the details of the various embodiments contemplated herein, it would be beneficial to describe a 5G network to which the aforementioned 5G device may connect. FIG. 1 illustrates an example 5G network 100 in which or with which various embodiments of the present disclosure may be implemented. A mobile network can be thought of as comprising two component networks, the radio access network (RAN) and the core network.

A mobile network's RAN may include various infrastructure, e.g., base stations/cell towers, masts, in-home/in-building infrastructure, and the like. The RAN allows users of mobile devices (also referred to as user equipment (UE), e.g., smartphones, tablet computers, laptops, vehicle-implemented communication devices (e.g., vehicles having vehicle-to-vehicle (V2V) capabilities), to connect to the core network. FIG. 1 illustrates a plurality of 5G small base stations or small cells and 5G macro base stations or macro cells, i.e., 5G macro cells 106, 110, and 112, and 5G small cell 108.

Macro cells can refer to (tall, high-powered) "macro" base stations/cell towers that are able to maintain network signal strength across long/large distances. 5G macro cells may use multiple input, multiple output (MIMO) antennas that may have various components that allow data to be sent and/or received simultaneously. In the example 5G network 100 of FIG. 1, 5G macro cell 106 may provide wireless broadband coverage/communications to vehicles 120 and 122. 5G macro cell 110 may provide broadband service to an area, such as a city or municipality 128. Likewise, 5G macro cell 112 may provide broadband coverage to an area, such as a city or municipality 130. The MIMO antennas used by 5G macro cells may comprise large numbers of antenna elements, which can be referred to as massive MIMO, whose size may be comparable to, e.g., 3G and/or 4G base station antennas.

5G small cells can refer to wireless transmitters/receivers implemented as micro base stations designed to provide coverage to areas smaller than those afforded coverage by 5G macro cells, e.g., on the order of about 100 meters (m) to 200 m for outdoor 5G small cells. Indoor 5G small cell deployments may provide coverage on the order about 10 m. 5G small cells can be mounted or integrated into/onto street lights, utility poles, buildings, etc., and like 5G macro cells, may also leverage massive MIMO antennas. In the example 5G network 100 of FIG. 1, 5G small cell 108 provides broadband coverage to a house 124 and smartphone 126.

The core network may comprise the mobile exchange and data network used to manage the connections made to/from/via the RAN. As illustrated in FIG. 1, the core network of 5G network 100 may include central server 102 and local server 104. Central server 102 is shown to effectuate broadband service to area 130 by way of 5G macro cell 112. Central server 102 may also operatively connect to local server 104, which in turn, provides broadband connectivity by way of 5G macro cells 106 and 110, as well as 5G small cell 108. The use of distributed servers, such as local server 104, can improve response times, thereby reducing latency. The core network may leverage network function virtualization (instantiation of network functions using virtual machines via the cloud rather than hardware) and network slicing (segmentation of 5G network 100 in accordance with a particular application, industry, or other criteria) to provide these lower response times, and provide faster connectivity.

As alluded to above, each device or UE, e.g., smartphone, satellite phone, etc. in a telecommunications network may be uniquely identified by its IMEI/PEI, rather than a SIM card installed therein. This is because SIM cards are typically provided by network operators or service providers, and are easily swapped into different UEs. A typically network procedure involves checking a UE's PEI/IMEI to determine whether or not the subscriber (identified by the SIM card) is allowed use the UE, and also to identify whether or not the UE is stolen or not.

In a typical network, the EIR may be a centralized register comprising a database of IMEIs associated with denylisted UEs. Service providers may subscribe to an EIR, and if a UE's IMEI is present in an EIR, that UE is prohibited from working on member service provider networks. Centralized EIRs can be established on a country-wide basis, or within a particular network, depending on country regulations. Today, networks perform periodic equipment check requests against a centralized EIR to check the association between SIM cards and a UE's PEI/IMEI to stop stolen or unauthorized devices from connecting to the network. With the advent of 5G, a 5G-EIR has been introduced, and the AMF (or other NF) can request access to a 5G-EIR over an N5g-eir interface to verify UE status.

With the advent of network slicing, as noted above, service provider/network operators or network slice tenants may define policies that control which UEs are able to connect to specific slices. Some slices may be private (non-public networks), and for security reasons, access should be limited to a defined set of UEs. This can arise in the context of, e.g., industrial IoT, manufacturing, smart city use cases, and the like. In accordance with current 5G standards, the right to connect to a slice is linked to the subscriber profile. Thus, if a SIM card is moved from one UE to another, this would potentially allow non-authorized UEs to connect to a slice, unless additional checks are performed as part of a network access request. Moreover, for slices that are intended to be accessible to a specified number of UEs, the set of authorized UEs should be managed as an allowlist (also commonly referred to as a "whitelist"). This is because the number of UEs that would not be allowed access would be exponentially larger than the number of UEs that would be allowed access. Hence, controlling access to such a slice would be easier/more efficient across a smaller rather than larger number of UEs. In a case where a slice is used as a private network (e.g. on behalf of an enterprise tenant), the tenant may be able to manage their own slice-specific allowlist, whereas conventional EIR data, as discussed above, is mainly used for stolen/duplicate UEs, and is mandated by regulatory bodies or as part of a consortium of operators.

Further still, and because there is overhead associated with sending requests to a centralized database (and to avoid the EIR becoming a bottleneck), EIR checks are typically performed periodically (subject to country regulations), rather than with every network access request. In the 5G context, and in particular for private slices, device access control should be performed on each access request to prevent unauthorized access. Performing such a check upon receipt of each access request would also allow the EIR to immediately detect use of a new UE, and to trigger mandatory UE configuration activities before the UE is allowed to connect to the requested slice.

For low-latency use cases, there is also an opportunity to reduce response times by optimizing EIR-related message flows. In this way, multiple queries to centralized databases or NFs can be avoided, not to mention, a UE that is not allowed to attach to a network and/or is allowed to use/access a certain slice(s) can be identified as early as possible in the network, either during registration call flow or periodic check.

Further still, according to the manner in which slices are implemented in 5G, a UE can request to connect to multiple slices, e.g., up to eight slices. Thus, UE access control policies may be applied to each requested slice, resulting in some slices allowing access, while other slices rejecting the requested access. At the end of the registration procedure, the AMF may return to the device, the subset of slices that the device may use. Upon conclusion of the UE registration procedure, the AMF can reply to the UE with a list of the "allowed" slices. Currently, as will be discussed below, a UE may send a request for a number of slices (e.g. eight) in a requested slices list to the AMF. The AMF can reply to the UE with some subset (or all if allowed) of those requested slices reflected in an allowed slices list. It should be understood that allowed slices in this context can have a temporal aspect, e.g., the slices reflected in an allowed slices list from the AMF refer to those slices the UE is allowed to connect to at that point in time. This can differ from, e.g., a tenant-defined allowlist setting forth those UEs that may be allowed to connect to that tenant's slice(s). For example, a tenant's allowlist may specify certain UEs as having the authority to access that tenant's slice(s). However, with the addition of a temporal constraint, some of those UEs may nevertheless be denied access in accordance with the temporal constraint Other constraints, such as temporal constraints, location-based constraints, etc. may be considered/specified in an access control policy.

Typically, a centralized 5G-EIR can be deployed in a network. When the core network, predominantly, the AMF, checks the status of a UE vis-a-vis the UE's PEI, the AMF may send an equipment status request message to the centralized 5G-EIR. The 5G-EIR can access its database and provide information regarding the status of the UE to the AMF. In some countries, PEI/IMEI checks for the purpose of checking UE status can be performed periodically, which result in additional equipment check request messages being sent to the centralized 5G-EIR.

Figure 2A:
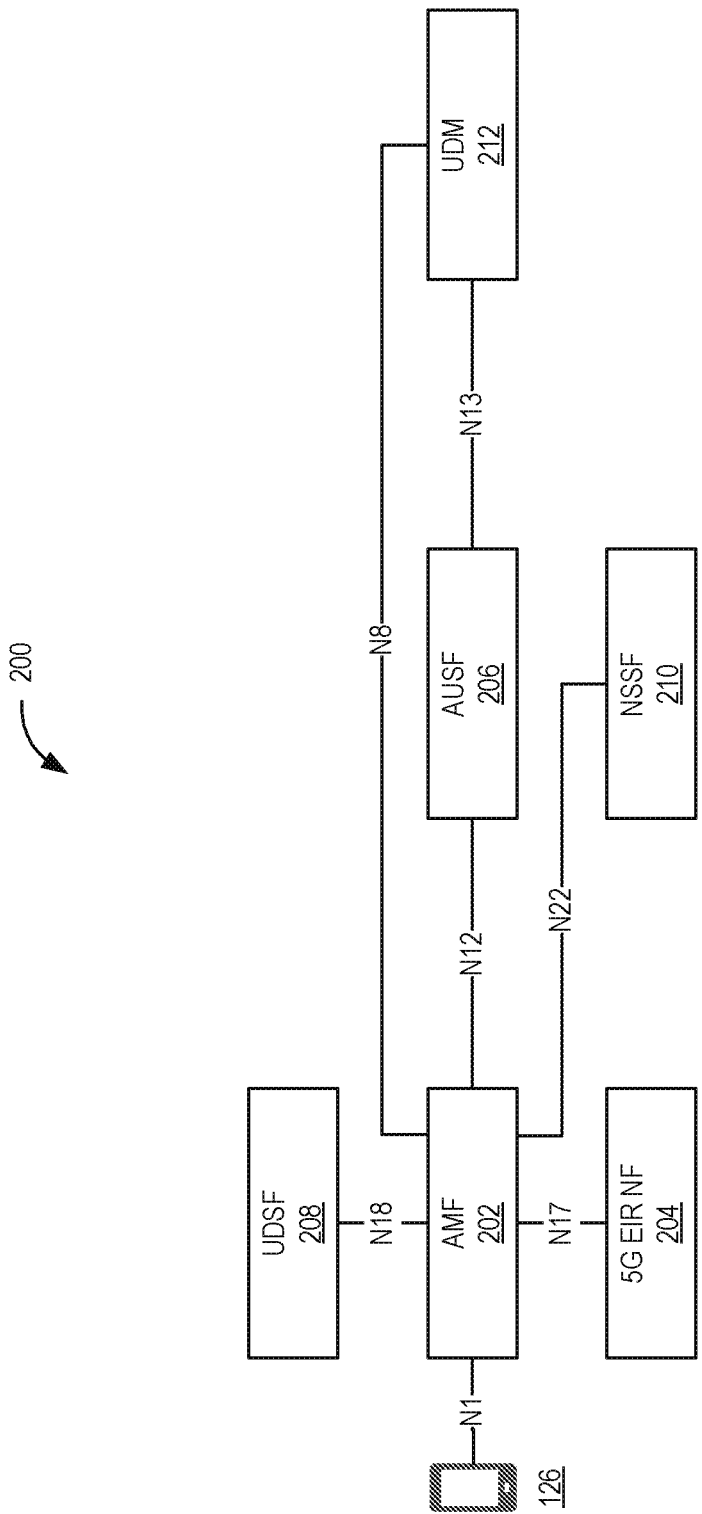
FIG. 2A illustrates a subset of conventional 5G network functions.

FIG. 2A illustrates an example representation of certain 5G system Network Functions (NFs), although not all NFs/elements are necessarily illustrated. For example, other examples of NFs that may be part of a 5G system, may include, but are not limited to, a session management function (SMF), a unified data management (UDM), a uniform data repository (UDR), etc. It should be understood that NFs in the 5G core network may discover other NFs through the NF repository function (NRF), while structured or standard data may be stored in a UDR, which is accessible by other NFs, e.g., the UDM. As noted above, the AMF, e.g., AMF 202, may receive connection and session-related information from UEs across N1/N2 reference point interfaces (between UE and AMF/between RAN and AMF), but may only handles connection and mobility management tasks. That is, an AMF instance may be specified by a UE, e.g., UE 126, in a Non-Access Stratum (NAS) message that is routed to the AMF instance by the RAN. Performing the role of an access point to the 5G core network (terminating the RAN control plane and UE traffic), the AMF instance may authenticate the UE and manage, e.g., handovers, for the UE between gNBs.

As illustrated in FIG. 2A, AMF 202 may communicate with 5G-EIR 204 which may check the status of a UE's identity, i.e., to determine whether or not the UE has been denylisted, as discussed above. The N5g-eir can refer to the service-based interface exhibited by 5G-EIR 204 which can interact with AMF 202 over the N17 reference point interface. For example, during initial registration of a UE, the PEI associated with the UE can be obtained from the UE by AMF 202. AMF 202 can initiate an identity check by invoking a N5g-eir equipment identity check service operation.

As also illustrated in FIG. 2A, an authentication server function (AUSF) 206 may handle authentication requests for 3GPP access and non-3GPP access. AUSF 206 may be a termination point of user plane security while also providing any authentication/authorization services, in additional to slice security and IMSI/SUPI privacy. Accordingly, AUSF 206 may interact with AMF 202, which as noted above, traditionally handles certain UE-related authentication over an N12 reference point interface, and with a Unified Data Management (UDM) function 212 over an N13 reference point interface.

5G system architecture 200 may also include an Unstructured Data Storage Function (UDSF) 208 for storing dynamic state data. It should be understood that 5G NFs may be "stateless." That is, a stateful network element stores certain user/connection/association data, e.g., a context." If such a stateful network element fails, the connection fails. Connectionless network elements, however, need not locally store any related data, and a different network element with the requisite capabilities may be used instead, so that the connection/association can be guaranteed. Thus, UDSF 208 allows any NF to store/retrieve its unstructured data into/from UDSF 208, e.g., UE contexts. Typically, UDSF 208 belongs to the same public land mobile network where the NF is located. The N18 reference point interface occurs between UDSF 208 and any other NF with which it interacts, while the Nnrf service based interface is the service-based interface exhibited by UDSF 208.

As alluded to above, network slicing has been introduced as a new capability in 5G networks. Network Slice Selection Function (NSSF) 210 may maintain a list of network slice instances defined by an operator/tenant/etc., including slice definitions, e.g., required resources. As described herein, a UE, such as UE 126 may be configured with a list a network slices to which it is subscribed, and during registration, the UE can request those subscribed network slices. In conventional 5G networks, AMF 202 (in conjunction with NSSF 210 via an N22 reference point interface) can authorize the use of a network slice(s) using subscription information (based on SUPI/IMSI) from UDM 212 or by querying NSSF 210.

As also alluded to above, UDM 212 interacts with AUSF 206, in addition to AMF 202, via a N8 reference point interface. UDM 212 may be used to store/manage subscription data relevant to a consumer NF. Consumer NFs may also use UDM to subscribe/un-subscribe from data change notifications. For example, UDM 212 allows AMF 202 (one example of a consumer NF) to get notified when UDM 212 modifies subscription data.

In some embodiments, the functionality of a typical AMF can be expanded to include slice access authorization, where the AMF, in addition to checking on SUPI/PEI status, can apply access control policies for the slices available in an area. Information regarding the available slices can be compared to information regarding slices for which the UE seeks access and the slices for which the subscriber of the UE is allowed to access. Thus, in some embodiments, an enhanced AMF may provide a mechanism for allowing/disallowing UE access (based on its PEI) to a particular slice. Moreover, in some embodiments, the aforementioned centralized EIR typically implemented in a network, e.g., centralized 5G-EIR, can be localized with the enhanced AMF. In this way, a local version/instance of and EIR database can be maintained, and the amount of messaging to the centralized 5G-EIR (across the network) can be reduced.

Figure 2B:
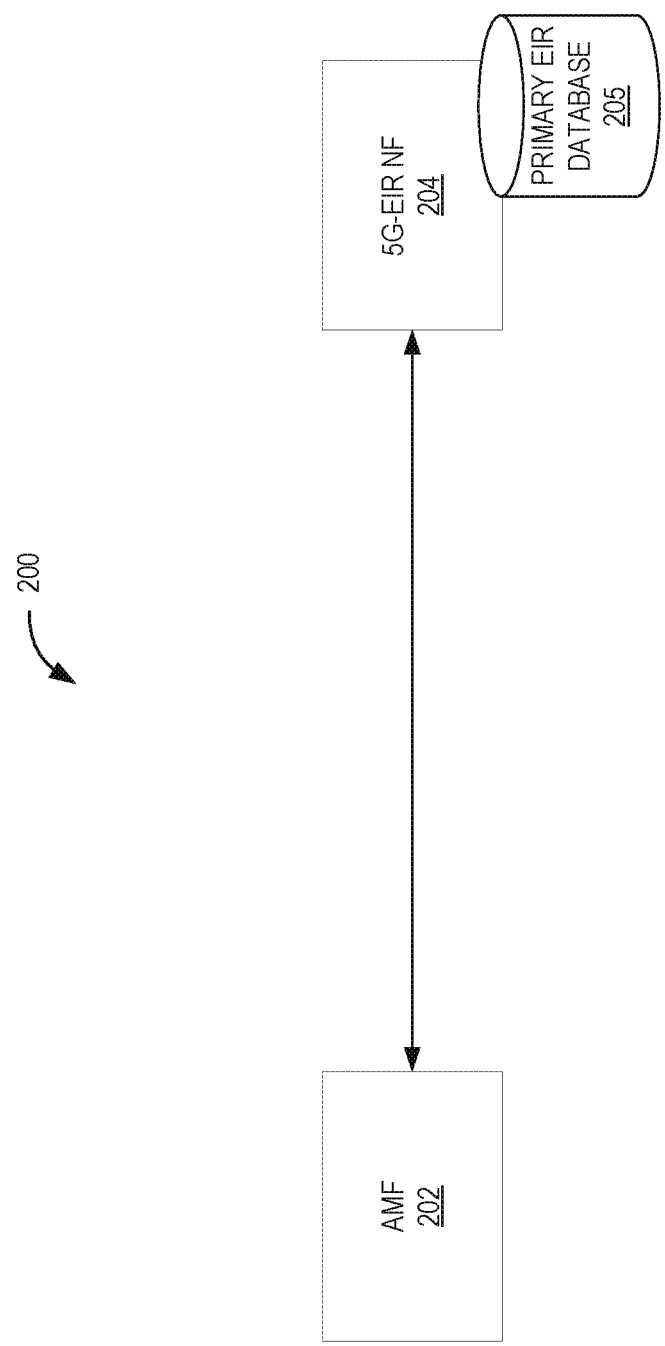
FIG. 2B illustrates an example of a subscriber-device check in a 5G network.

FIG. 2B illustrates an example representation of a subscriber-device check as currently implemented in a conventional 5G system. As alluded to above, an AMF, in conjunction with the 5G-EIR NF, can perform a SUPI/PEI check. That is, AMF 202 can issue a Check_IMEI request to 5G-EIR NF 204/perform a EquipmentIdentityCheck operation during UE registration that includes the SUPI and PEI of the requesting UE. Such a check is optional, and can be performed periodically to prevent prohibited UEs from connecting to a network, and to detect when the SUPI (associated with a SIM card), has been switched to another UE. Again, no slice-specific policies or checks are performed in a conventional 5G network by a conventional 5G-EIR NF. A primary EIR database 205 can maintain the subscriber-to-device (SUPI-PEI) mapping, and a denylist of prohibited devices (identified by PEI). 5G-EIR NF 204 can respond to the request with an allow/not-allow network attachment request.

As alluded to above, network slicing has been introduced as a new capability in 5G networks. Network Slice Selection Function (NSSF) 210 may maintain a list of network slice instances defined by an operator/tenant/etc., including slice definitions, e.g., required resources. As described herein, a UE, such as UE 126 may be configured with a list a network slices to which it is subscribed, and during registration, the UE can request those subscribed network slices. In conventional 5G networks, AMF 202 (in conjunction with NSSF 210 via an N22 reference point interface) can authorize the use of a network slice(s) using subscription information (based on SUPI/IMSI) from UDM 212 or by querying NSSF 210.

Figure 3:
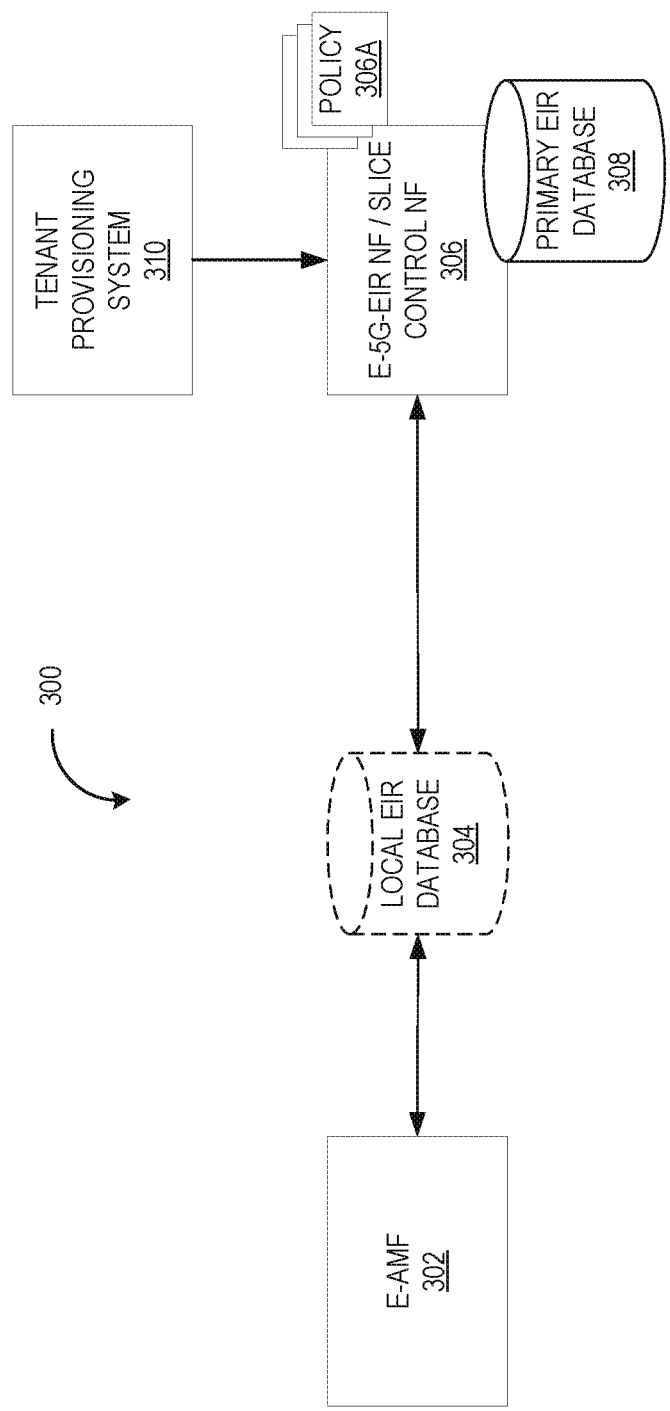
FIG. 3 illustrates an example of a slice access control system architecture in accordance with various embodiments.

FIG. 3 illustrates an example enhanced AMF/enhanced-5G-EIR architecture 300. Architecture 300 may include an enhanced AMF (E-AMF) 302 and an enhanced 5G-EIR NF (E-5G-EIR NF) 306 that may be in operative communication with a tenant provisioning system 310. In some embodiments, as will be described in greater detail below, a slice control function may be utilized as an alternative to an E-5G-EIR NF. Architecture 300 can be used to effectuate SUPI/PEI checking with per-slice access control. The existing Check_IMEI request/EquipmentIdentityCheck operation can be enhanced to additionally check for a list of requested slices (identified via Network Slice Selection Assistance Information (NSSAI). That is, E-AMF 302 may transmit a Check_IMEI request to E-5G-EIR NF 306. The Check_IMEI request may include SUPI and PEI associated with the requesting UE, as well as requested NSSAI. E-5G-EIR NF 306 may respond to the request with the list (e.g., subset) of NSSAI to which the requesting UE is allowed to connect. For each requested slice, E-5G-EIR NF 306 can apply any relevant per-slice access control policy(ies) 306A. It should be understood that conventional 5G-EIR implementations do not contain/maintain any slice-level information, unlike an E-5G-EIR NF, such as E-5G-EIR NF 306 contemplated herein, which may include tenant UE lists (specific to particular network slices, the aforementioned per-slice access control policies, etc).

Primary EIR database 308 may, similar to primary EIR database 205 (FIG. 2B), maintain information regarding SUPI-to-PEI mapping, and a denylist of prohibited PEI. However, primary EIR database 308 may further maintain per-slice access control policies, as well as per-slice allow-lists and/or per-slice denylists. It should be understood that tenant provisioning system 310 may refer to any system or mechanism used by tenants to set access control policies and lists for their network slices. For example, a tenant provisioning system 310 may be implemented in/may be part of a tenant's network management system.

In accordance with some embodiments, for efficiency purposes, an optimized per-slice access control mechanism can be implemented. That is, in some embodiments, per-slice access control can be checked/policies enforced each time a UE registers. To accomplish this, a local EIR database 304 may be utilized. That is, E-AMF 302 may perform local SUPI/PEI checks against local EIR database 304. That is, E-AMF 302 may perform a check against local EIR database 304 to determine UE status based on PEI/IMEI and/or SUPI/IMSI information. For example, E-AMF 302 may communicate with local EIR database 304 to check the status of a UE's identity to determine whether or not the UE has been denylisted, as discussed above. Thus, local EIR database 304 can maintain a local or cached list of denylisted devices. However, instead of initiating an identity check across the network to E-5G-EIR NF 306, E-AMF 302 may interact locally with local EIR database 304. In the event that a requesting UE is found to be on the local EIR database 304 denylist, E-AMF 302 need not contact/interact with any other NF in the 5G network for any services/slices relative to the denylisted UE.

Additionally, E-AMF 302 may perform 5G network slice-based checks. As alluded to above, E-AMF 302 may receive a request from a UE to access one or more slices of the 5G network (e.g., delineated in accordance with a tenant-specified region, service, etc.). To that end, E-AMF 302 may also apply per-slice access control policies to control UE access to a 5G network slice. E-AMF 302 may perform a check slice operation to determine if the network slice(s) requested by the UE is/are available in the particular operating region/zone of the E-AMF 302. E-AMF 302 may also perform a check slice operation to determine whether or not a requesting UE is allowed to connect to a slice(s). That is, E-AMF 302 may compare a UE's requested slice(s) (which can be identified by one or more, currently up to eight, Single Network Slice Selection Assistance Information (S-NSSAI) elements sent in NSSAI in signaling messages between a UE and E-AMF 302) to those slices to which the requesting UE can access.

For example, E-AMF 302 may interact with/access local EIR database 304 to determine which slice(s) a requesting UE is allowed to access. Local EIR database 304 may maintain a local or cached copy of per-slice allowlists to allow E-AMF 302 to make this determination. It should be understood that the per-slice allowlist(s) maintained by local EIR database 304 can be determined/provisioned by a tenant/service provider providing the 5G network/slice being accessed by the UE. For example, E-AMF 302 may interact with the NSS Function (NSSF) of the 5G network (NSSF 210) via an N22 reference point interface to determine any allowed slices that will serve the requesting UE. The slices that can be accessed/will serve the requesting UE can be considered to be a common subset of the slice(s) requested by the requesting UE, the slice(s) to which the UE is subscribed (determined, e.g., via the per-slice allowlist maintained in local EIR database 304), and the slice(s) that are available in the E-AMF 302's zone or region of operation.

Further still, local EIR database 304 can maintain local copies/instances of per-slice access control policies. Thus, E-AMF 302 can perform other check slice operations to determine how to control access to any requested slice(s) according to such per-slice access control policies, and may apply such per-slice access control policies to the requesting UE as appropriate. It should be understood that in accordance with some embodiments, a tenant may specify operational parameters regarding access control policies. That is, a tenant can not only allow/prohibit access to a slice, but a tenant can also configure access control policies to allow/prohibit slice access in accordance with certain, more fine-grained constraints or policies. For example, a tenant may specify that certain UEs may access a slice, and in addition, those certain UEs may access the slice according to particular time constraints, e.g., at certain times, or for a particular duration of time. In some embodiments, a tenant may specify a particular order with which UEs may access a slice, e.g., a first identified UE may access a slice, and a second identified UE may only access the slice after the first identified UE connects to the slice, and so on.

In some embodiments, access control policies can evolve and change according to particular operating conditions, as can the application of those access control policies. For example, a tenant may specify that a certain type of UE may access a particular slice. However, upon a certain threshold number of that type of UE connecting to the slice, the access control policy may then impose a cutoff, where no other UEs, regardless of type, may connect to the slice. In some embodiments, if a UE leaves/disconnects from a slice, the access control policy may specify that a new UE of the requisite type can connect, and so on. It should be understood that the defined structure of a PEI/IMEI typically includes device type information, along with vendor identification and the device identification information. In the event, a UE does not provide its PEI or a UE's PEI is not retrieved from an AMF, an identity request procedure can be initiated by the AMF by sending an identity request message to the UE to retrieve the PEI.

In some embodiments, access control policies, the E-AMF, and/or the E-5G-EIR NF may evolve based on learned information. For example, access control policies may be derived from learning models that generate new rules/update rules depending on information gleaned from the E-AMF regarding how such access control policies have been applied and/or the resulting operation of the network subsequent to application of such access control policies. For example, the E-AMF may learn over some period of time that latency associated with a particular slice increases to a threshold level upon a particular number of UEs being connected to the slice. Accordingly, the EIR NF may adapt a particular access control policy to not only limit what UE's are able to access a slice (as may have been originally specified in that particular access control policy), but to further limit the number of UEs that are able to access the slice. Information, data, and/or statistics may be gathered within or throughout a network, and used as a basis for or to prompt some access control policy adaptation(s). The same can be done for per-slice allowlists, denylists, etc. For example, a per-slice allowlist may be adapted to contain only a particular number of UEs based on which UEs were first to connect to the slice during a previous registration period. It should be understood that the above scenarios, variations are examples, and not meant to limiting in any way.

As noted above, access to slices can be controlled based not only on subscriber information (e.g., IMSI/SUPI) but also on a per-device/per-UE basis. That is, a UE's PEI/IMEI can be checked/authenticated against any slice(s) requested by the requesting UE. Whereas a typical AMF implementation would only check slice access based on IMSI/SUPI information being matched or authenticated to a particular slice, in some embodiments, the E-AMF 302 may perform a UE identity status check that includes authenticating slice access against the PEI/IMEI of the requesting UE. For example, during a UE registration procedure, E-AMF 302 can compare a requesting UE's requested slice(s) (identified by NSSAI) to the slice(s) to which the user/subscriber (identified by SUPI/IMSI in the requesting UE's SIM card) is subscribed. In addition, E-AMF 302 can determine whether or not the actual requesting UE is able to access or can be served by/with the particular slice(s) being requested. That is, E-AMF 302 can determine whether or not the requesting UE PEI/IMEI matches the PEI/IMEI mapped to the SUPI/IMSI. If so, it can be assumed that the SIM card (from which the SUPI/IMSI is obtained) is operative in an authorized UE, i.e., the SIM card has not been put into and is not being used in any unauthorized, e.g., stolen or duplicated UE, and E-AMF 302 can retrieve the relevant per-slice access control policies to apply to the requesting UE. If the UE PEI/IMEI does not match the PEI/IMEI mapped to the SUPI/IMSI, it can be assumed that the SIM card has been put into/is being used with an unauthorized UE, and should be denied access. It should be noted that in some embodiments, alternatives to access denial may be provisioned, e.g., in some embodiments E-5G-EIR NF 306 may be notified of mismatched/changed PEI/IMEI-to-SUPI/IMSI mapping, instead of outright/immediate access denial. Other options for addressing mismatched mappings would be known/understood by those of ordinary skill in the art, and are contemplated herein.

In some embodiments, upon identifying a mismatch of a PEI/IMEI-to-SUPI/IMSI mapping, e.g., between the SUPI/PEI received from/presented by a UE and the PEI/IMEI-to-SUPI/IMSI maintained by local EIR database 304, E-AMF 302 may inform E-5G-EIR NF 306 of the mismatch so that E-5G-EIR NF 306 can apply the change (if warranted) and propagate the change to local EIR database 304. In some embodiments, a tenant, UE owner, and/or SIM card owner may be involved in propagating such a PEI/IMEI-to-SUPI/IMSI mapping change, e.g., E-5G-EIR NF 306 may inform an entity of a mismatch, and may obtain its approval before accepting the change. Various confirmatory/query mechanisms may be used in this approval-seeking procedure. It should be understood that a mismatch can also occur in the event there is not yet any PEI/IMEI-to-SUPI/IMSI mapping information. For example, if a UE is connecting to a network for the first time and/or if a UE has not been pre-registered with E-5G-EIR NF 306, the controlling entity, e.g., tenant, may specify what slice access control policy to apply, and E-AMF 302 would inform E-5G-EIR NF 306 accordingly.

As illustrated in FIG. 3, local EIR database 304 may comprise cached copies/instances of the UE denylist as well as the PEI/IMEI-to-SUPI/IMSI mappings maintained in primary EIR database 308. Local EIR database 304 may maintain up-to-date cached copies/instances vis-à-vis centralized EIR NF 306. Thus, in accordance with some embodiments, E-5G-EIR NF 306, in conjunction with primary EIR database 308 (and in some embodiments, one or more local EIR databases, an example of which is local EIR database 304), can replace the conventional (centralized or hierarchical implementation of) 5G-EIR NF 306 such that E-5G-EIR NF 306 is provided to each E-AMF instance.

It should be understood that that there can be some determined number of AMFs in a given 5G network, e.g., one per target area or geographical zone. In some embodiments, a local EIR database, such as local EIR database 304, can be located within each area or zone, containing a cached copy of the mapping between PEI/IMEI and SUPI/IMSI, a list of the denylisted UE, as well as per-slice access control policies and per-slice allowlists of UEs that are allowed to access or connect to each slice. The local or cached copy of the PEI/IMEI-to-SUPI/IMSI mapping can be kept in sync with a centralized, primary copy of the PEI/IMEI-to-SUPI/IMSI mapping maintained at primary EIR database 308. The same can be true for the per-slice access control policies and per-slice allowlists. However, in other embodiments, the per-slice access control policies and the per-slice allowlists can be provisioned in areas or zones where a relevant slice is active. For example, a particular slice associated with a manufacturing IoT network may be active in a first target area or geographical zone, but not active or available in a second target area or geographical zone. Thus, a local EIR database implemented locally/co-located with an E-AMF in the second target area or geographical zone need not maintain a cached or local copy of the per-slice access control policies and/or per-slice allowlist associated with the manufacturing IoT network.

It should be understood that by using a local EIR DB, such as local EIR database 304, typical latency issues associated with conventional 5G system architectures may be avoided. Moreover, various embodiments provide the ability for an E-AMF, such as E-AMF 302 to perform UE identity status checks/per-slice check or authentication/authorization operations on every network access request, if desired, rather than being limited to periodic checks. Further still, tenants can set policies to define access control policies per-slice and per-UE that are to be applied, while per-slice allowlists (which can also be provisioned by a tenant) can be accessed directly by the E-AMF, to avoid creating a bottleneck at a typical centralized 5G-EIR. Moreover, as noted above, if a UE is determined as being unauthorized to access a slice(s), that slice(s) is removed from the allowed slice list returned to the UE during/upon completion of the UE registration procedure. It should also be understood that in conventionally-implemented slice control, a allowlisted UE results in that UE being allowed access to all slices. In accordance with various embodiments disclosed herein, a UE can be allowlisted for certain slices, while denylisted for others.

Although various embodiments described herein refer to a localized EIR database as providing PEI/IMEI-to-SUPI/IMSI mapping information, per-slice allowlists, denylists, etc., such a repository, in some examples, may be a localized version of an EIR database, or in some examples may be a new slice control NF and associated data store. In some embodiments, such a new slice control NF and associated data store containing slice control-relevant information can be implemented in a network to provide the requisite functionality to enable E-AMF 302 to perform its UE and slice check operations. The E-AMF may be implemented as a standalone function, and/or as an extension or enhancement to the existing AMF of a network. Some embodiments, as described above, leverage and build upon existing NFs, while in other embodiments the requisite functionality may be implemented in other network elements such as an access point, gNB, etc.

Moreover, in some embodiments, rather than rely on existing UE identifiers such as the PEI/IMEI and SUPI/IMSI information, a new certificate or information element can be used to identify UEs or devices. For example, in some embodiments during manufacture of a UE or device, or during provisioning by a tenant/service provider, such a certificate can be hardcoded or downloaded onto the UE or device. It should be noted that in some regions or countries, providing false PEI information can be prohibited/may be illegal, and if a manufacturer does not trust the manner in which PEI information is allocated and/or if particular vendors are not respecting such regulations, an operator can provide its own identification certificate. In this way, embodiments described herein can be further adapted to base slice access and UE status checking on such a certificate rather than conventional PEI/IMEI data. The same can be true for SUPI/IMSI data, where a new/alternative mechanism for identifying a subscriber/SIM card may be used. For example, such certificates can be provisioned on/in a UE SIM card, where access to a given slice would be allowed if the UE is able to provide the requisite certificate.

Figure 4:
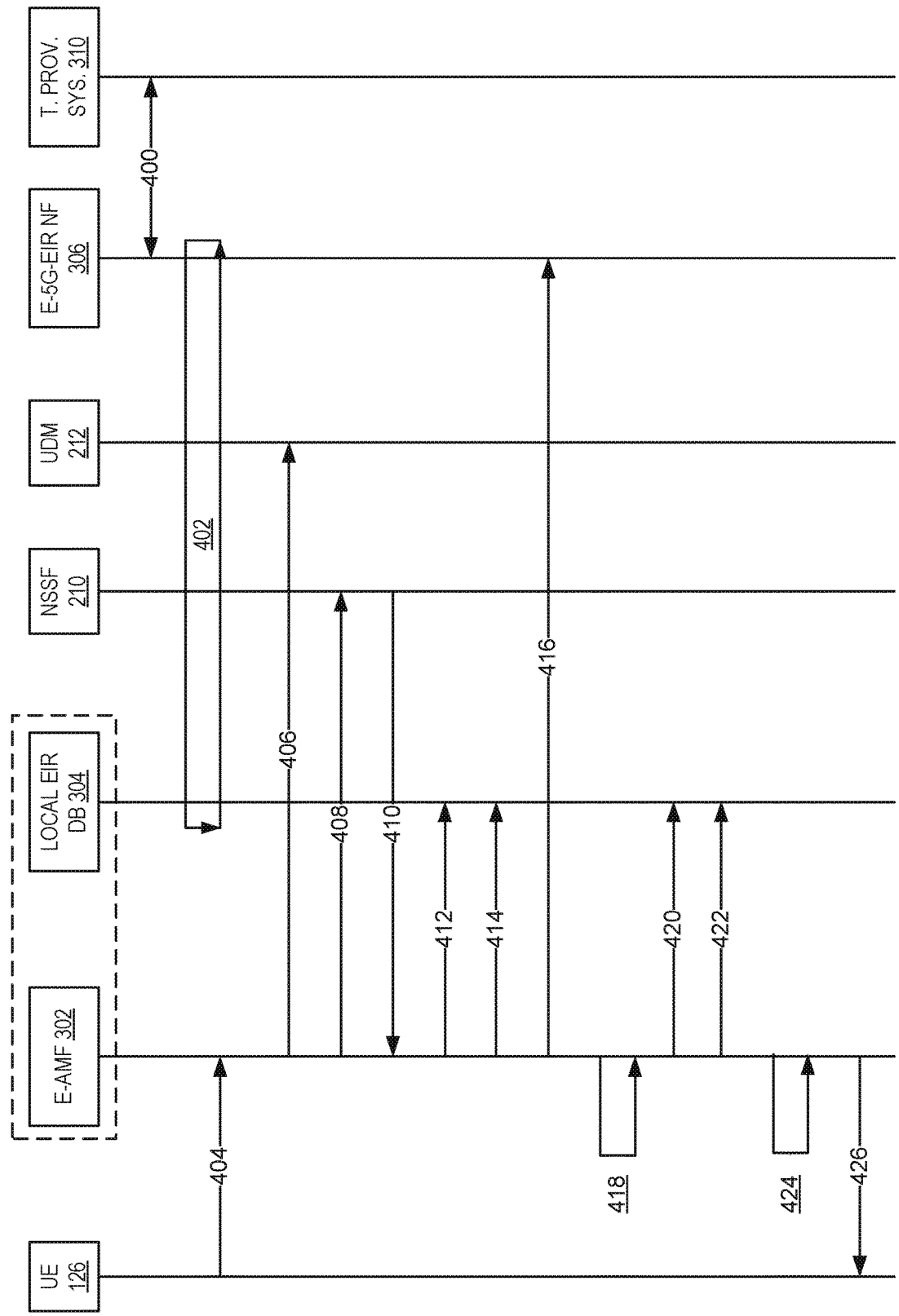
FIG. 4 illustrates a message call flow for effectuating slice access control in accordance with one embodiment.

FIG. 4 illustrates an example message flow diagram reflecting operations performed to effectuate improved slice access control in accordance with one embodiment. As noted above, E-5G-EIR NF 306 can be provisioned/configured to store and maintain slice access control policies and lists. Such policies and lists can be generated or created by a tenant provisioning system, such as tenant provisioning system 310, and exchanged with E-5G-EIR NF 306 with messaging 400. In some embodiments, as described above, a local EIR database, e.g., local EIR database 304 may be used to cache or provide a local copy of the slice access control policies and lists maintained by E-5G-EIR NF 306 (and primary IER database 308). Thus, through messaging 402, E-5G-EIR NF 306 (and primary IER database 308) and local EIR database 304 can engage in caching/synchronizing access control policies and lists.

Through messaging 404, and during UE registration, a UE, e.g., UE 126, may transmit a registration request to E-AMF 302 along with NSSAIs requesting access to subscribed network slices. Accordingly, E-AMF 302 may, via messaging 406, after authenticating UE 126, retrieve from UDM 212, subscribed slices associated with the SUPI obtained from/associated with UE 126. E-AMF 302 may then send a NSSF request (Nnssf_NSSelection_Get) to NSSF 210 via messaging 408. NSSF 210 may respond by returning a list of allowed NSSAIs in an allowed NSSAI list via messaging 410.

For each network slice (identified by NSSAI in the allowed NSSAI list), E-AMF 302 retrieves the applicable access control policy(ies) associated with that network slice via messaging 412. If a SUPI/PEI check is required in accordance with the applicable access control policy(ies), E-AMF 303, via messaging 414, checks the SUPI associated with the PEI to see if it matches the SUPI/PEI mapping reflected in local EIR database 304. If there is a mismatch, E-AMF 302 may inform E-5G-EIR NF 306 of this inconsistency, as described above, via messaging 416. Additionally, if the PEI does not match (i.e., the PEI has changed), E-AMF 302 may apply the applicable slice control policy at 418 by checking if the new/changed PEI is referenced in a per-slice denylist of prohibited devices at 420. If so, the UE registration request can be rejected. E-AMF 302 may also remove the particular slice from the list of allowed NSSAIs associated with UE 126 (if appropriate/in accordance with the slice access control policy). In some scenarios, at 422, E-AMF 302 may check to see if the PEI associated with UE 126 is on the slice allowlist. In some scenarios, E-AMF 302 may remove the slice from the allowed NSSAI list. It should be understood that the allowlist check can be performed using a UE's PEI or the check may be performed relative to the type of UE making the request, which can be accomplished by checking the PEI prefix. Any other slice control access policies may be applied (and appropriate checks/notifications/actions performed) at 424. E-AMF 302 may then return to UE 126, a registration response that includes those slices for which access is allowed via messaging 426. It should be understood that slice control access policies need not be applied when a mismatch occurs. For example, a SUPI-to-PEI match may occur, but the SUPI is not allowed access to a particular slice, e.g., SUPI-to-PEI mapping might not have changed, but the slice allowlist may have since been updated such that access by that PEI is no longer allowed, a change regarding time-of-day access, or other slice control access parameters may have changed.

It should be understood that in the context of 5G, a UE requesting access to a slice can refer to the UE attempting to attach to the network. Accordingly, each time a UE sends a network attachment request, or even when a UE is moving from one AMF/E-AMF to another AMF/E-AMF, a registration procedure/identity check is performed. Further still, an AMF/E-AMF with which a UE is registered may periodically perform an identity check of attached UEs. Moreover, tenants can be provision slice-specific allowlists rather than relying on potentially, voluminous denylists, especially in the context of slices for which only a small or limited number of devices/UEs are authorized.

By contrast, and in accordance with some embodiments, by utilizing an E-AMF, such as E-AMF 302 and localizing EIR data (via local EIR database 304), the latency and communications overhead associated with sending requests to a centralized 5G-EIR which are typically performed in conventional systems/implementations can be avoided. As illustrated in FIG. 4, with the use of E-AMF 302, and the ability to eschew the use of centralized 5G-EIR 204, E-AMF 302 can avoid performing the N5g-eir_EquipmentIdentity-Check_Get operation on a centralized 5G-EIR 204. As noted above, E-AMF 302 may simply access the requisite information/data regarding a requesting UE by accessing local EIR database 304. Therefore, not only can various embodiments perform UE or device-specific access control for one or more slices of a 5G network (resulting in better security than relying solely on subscriber-related information, e.g., SUPI/IMSI), but this improved security can be accomplished more quickly, with less overhead/resources, and more often (e.g., in response to every access request).

Figure 5:
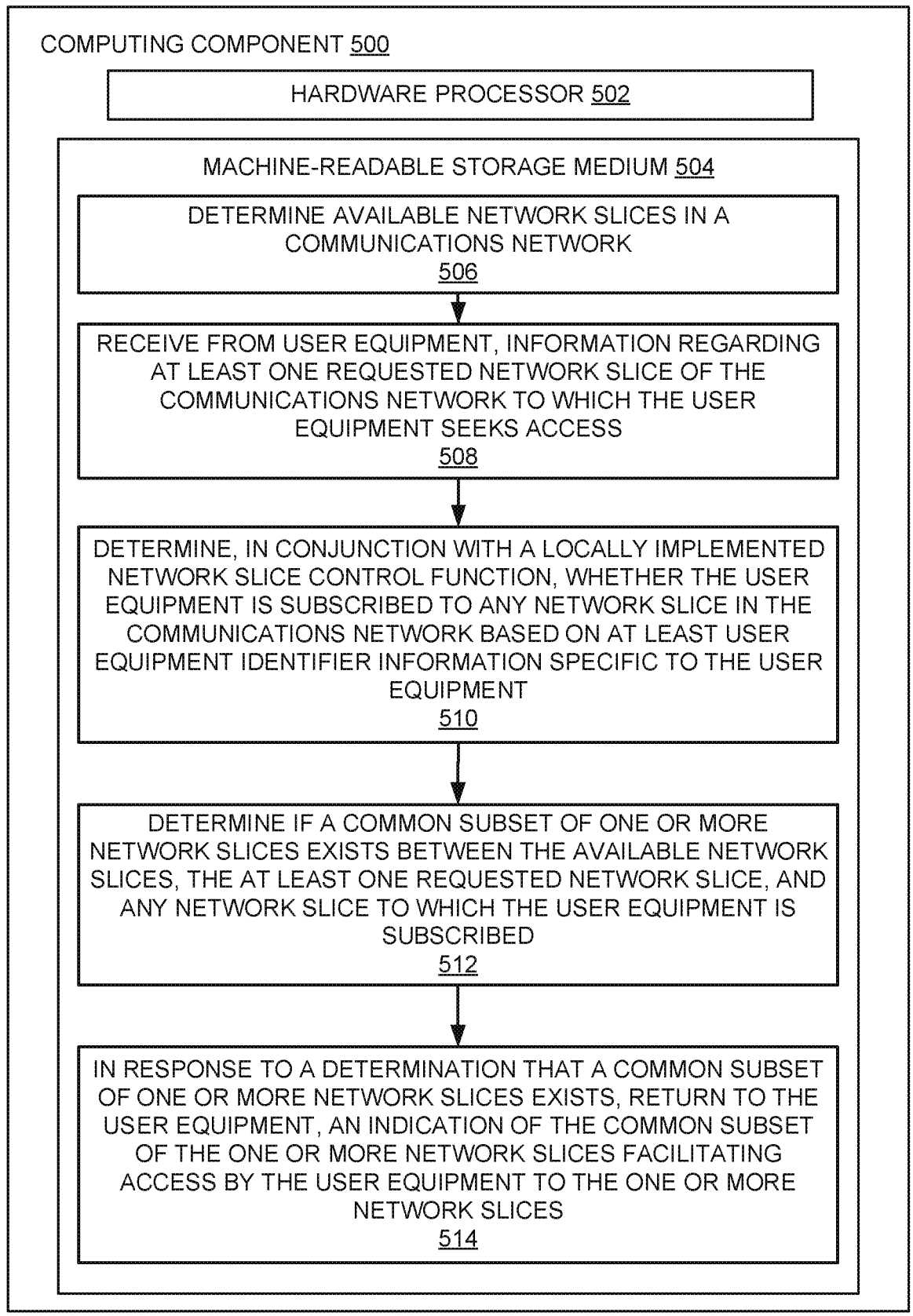
FIG. 5 is an example computing component that may be used to implement various features of slice access control in accordance with one embodiment of the disclosed technology.

FIG. 5 is an example computing component 500 that may be used to implement various features of AMF or AMF instance or similar element(s)/components in accordance with one embodiment of the disclosed technology. Computing component 500 may be, for example, a server computer, a controller, or any other similar computing component capable of processing data. In the example implementation of FIG. 5, the computing component 500 includes a hardware processor 502, and machine-readable storage medium 504.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-514, to control processes or operations for determining UE slice accessibility. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-514.

Hardware processor 502 may execute instruction 506 to determine if any network slices in a communications network, such as a 5G network, for example, are available. As noted above, in accordance with some embodiments, an E-AMF or similarly configured NF can determine what network slices in a particular region are available. In some embodiments, E-AMF instances can handle particular network slices configured in a particular region of a communications network.

Hardware processor 502 may execute instruction 508 to receive from a UE, information regarding at least one requested network slice of the communication network to which the UE seeks access. As discussed above, a UE may pass one or more S-NSSAI elements sent in NSSAI via signaling messages to an E-AMF to indicate those network slices the UE wishes to access.

Hardware processor 502 may execute instruction 510 to determine, in conjunction with a locally implemented network slice control function, whether the UE is subscribed to any network slice in the communications network based on at least UE identifier information specific to the UE. Currently, access to a network slice is premised on subscriber information, e.g., SUPI/IMSI information that can be gleaned from a SIM card used in a UE. However, because SIM cards can swapped into different UEs, a user/subscriber may obtain access to a particular network slice that the user/subscriber should not be able to access. For example, if a user/subscriber steals a UE and uses the SIM card from the stolen UE in another UE, that user/subscriber can nonetheless gain access to a network slice(s) to which the true user subscribes. Thus, in accordance with various embodiments, per-slice access is also based on UE identification information that is specific to the UE, rather than just to a user/subscriber, i.e., a UE's PEI/IMEI (or alternatively, a specific certificate or other identifier that can be tied to the UE).

Moreover, the locally implemented network slice control function can be a local implementation of a primary EIR database maintained by a centralized EIR NF, which can be implemented via a network management server(s) of the communications network, for example. Rather than interface with a centralized EIR NF, as is currently the case in 5G networks (via the 5G-EIR), as described above, a local EIR database can be co-located or locally maintained with the E-AMF to reduce latency and communications overhead. Moreover, per-slice check operations can be performed in response to every UE request, rather than only periodically, providing more/better access control security.

Hardware processor 502 may execute instruction 512 to determine if a common subset of one or more network slices exist between the available network slices, the at least one requested network slice, and any network slice to which the UE is subscribed. Hardware processor 502 may execute instruction 514 to i return to the UE, an indication of the common subset of the one or more network slices facilitating access by the UE to the one or more network slices. This can be done in response to a determination that a common subset of one or more network slices exists, As described above, an E-AMF may perform an identity check, e.g., Check_IMEI request or EquipmentIdentityCheck, in conjunction with the E-5G-EIR NF (whether remotely or vis-a-visa a local EIR database). An allowed slice list can be returned to the E-AMF that includes those slices that the UE is allowed to access. Any slices the UE is not allowed to access will not be included in the allowed slice list.

Figure 6:
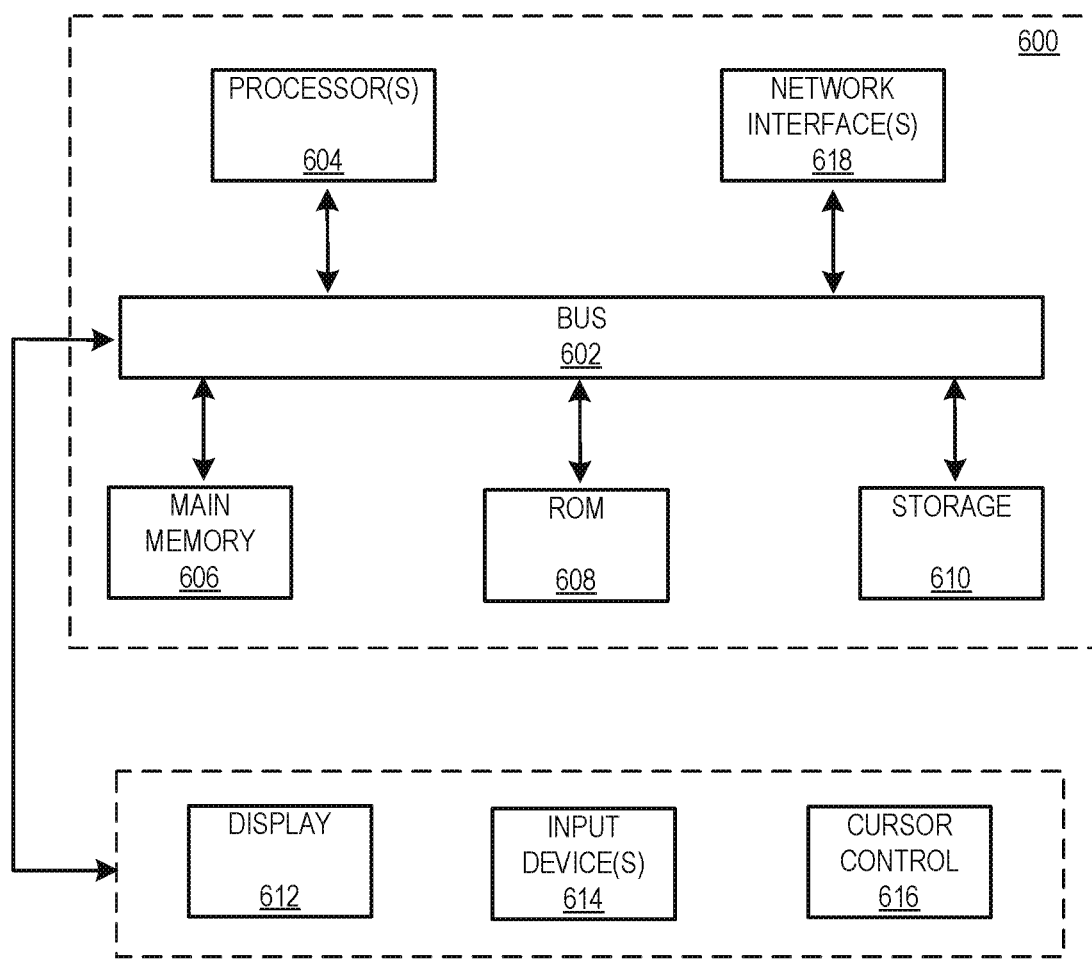
FIG. 6 is an example computing component that may be used to implement various features of embodiments of the present disclosure.

FIG. 6 depicts a block diagram of an example computer system 600 in which various of the embodiments described herein may be implemented. For example, the functionality of one or more of the elements, network functions, etc. illustrated in any of FIGS. 1-5 may be implemented or effectuated by computer system 600. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions. Also coupled to bus 602 are a display 612 for displaying various information, data, media, etc., input device 614 for allowing a user of computer system 600 to control, manipulate, and/or interact with computer system 600. One manner of interaction may be through a cursor control 616, such as a computer mouse or similar control/navigation mechanism.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
a processor; and
a memory unit operatively connected to the processor and including computer code that when executed, causes the processor to:
perform an identity status check of a user equipment (UE), during a registration procedure, wherein the identity status check compares a UE permanent equipment identifier (PEI) with a mapped PEI in a subscription permanent identifier (SUPI) of a requested network slice in a plurality of network slices, wherein the identity status check is performed on a local equipment identity register (EIR) database of a network management system;
allow access to the plurality of network slices if the UE PEI matches the mapped PEI in the SUPI;
receive from the UE, information regarding at least one requested network slice of the plurality of network slices of a communications network to which the UE seeks access;
determine, in conjunction with a locally implemented network slice control function, whether the UE is subscribed to any network slice in the communications network based on at least UE identifier information specific to the UE;
determine if a common subset of one or more network slices exists between the plurality of network slices, the at least one requested network slice, and any network slice to which the UE is subscribed; and
in response to a determination that a common subset of one or more network slices exists, return to the UE, an indication of the common subset of the one or more network slices facilitating access by the UE to the one or more network slices.

2. The system of claim 1, wherein the system comprises an enhanced 5G access management function instantiated in a tenant-defined region of the communications network, and wherein the plurality of network slices are network slices available in the tenant-defined region.

3. The system of claim 1, wherein the locally implemented network slice control function comprises the EIR database local to the system, the EIR database comprising a cached copy of at least one of per-network slice access control policies, a per-network slice device allow list, a per-network slice device deny list; and a UE identifier information-to-UE subscriber information mapping.

4. The system of claim 3, wherein:
the per-network slice access control policies comprise one or more sets of constraints according to which access by a requesting UE to at least one of the plurality of network slices is granted; and/or
the per-network slice device allow list includes at least one of UE identifier information associated with UEs allowed to access a network slice, and UE identifier information associated with a type of UE allowed to access a network slice; and/or
the per-network slice device deny list includes subscriber identifier information; and/or
the UE identifier information comprises one of the PEI, an international mobile equipment identity (IMEI), or a hardcoded or downloadable UE-specific certificate; and/or
the network slice control function comprises a local instance of a primary equipment identity register (EIR) managed by a centralized EIR network function of the communications network; and/or
the network slice control function comprises a local instance of a primary equipment identity register (EIR) managed by a centralized EIR network function of the communications network; and/or
the computer code that when executed causes the processor to determine if a common subset of one or more network slices exists between the plurality of network slices, the at least one requested network slice, and any network slice to which the UE is subscribed is repeated each time the system receives from the requesting UE, information regarding at least one requested network slice of the communications network to which the UE access.

5. The system of claim 4, wherein the per-network slice device allow list further includes at least one of a number of UEs allowed to access a network slice, and a time-based constraint regarding access to a network slice.

6. The system of claim 3, wherein the memory includes computer code that when executed further causes the processor to associate the subscriber identifier information with the UE identifier information according to the UE identifier information-to-UE subscriber information mapping.

7. A network apparatus, comprising:
a processor; and
a memory unit operatively connected to the processor and including computer code that when executed, causes the processor to:
in response to a user equipment registration request retrieve a network slice access control policy from a local equipment identity register (EIR) database disposed in a geographical zone where a network slice is active, wherein the network slice access control policy specifies which network slice a user equipment (UE) may access;
determine based on the network slice access control policy which network slice the UE is able to access by confirming that a user equipment permanent equipment identifier (PEI) of the UE matches a mapped PEI in a subscription permanent identifier (SUPI) stored in the local EIR database; and, remove the UE from an allowed slice list, cached on the local EIR database, if the UE's PEI does not match the PEI mapped to the SUPI.

8. The apparatus of claim 7, wherein the network slice access control policy comprises a cached version of a network slice access control policy stored in a primary EIR database controlled by an EIR network function.

9. The apparatus of claim 8, wherein the network slice access control policy specifies at least one of a type of UE allowed to access a network slice of one or more requested network slices, a particular UE allowed to access the network slice, a temporal-based access constraint, or a location-based access constraint.

10. The apparatus of claim 7, wherein the computer code that when executed causes the processor to apply the network slice access control policy comprises computer code that when executed further causes the processor to compare UE identity information against at least one of a UE deny list and a UE allow list associated with the network slice.

11. The apparatus of claim 7, wherein the computer code that when executed causes the processor to apply the network slice access control policy comprises computer code that when executed further causes the processor to compare a prefix of UE identity information against at least one of an UE deny list and a UE allow list associated with the network slice to identify whether the UE is a type of UE allowed to access the network slice.

12. The apparatus of claim 7, wherein the memory includes computer code that when executed further causes the processor to transmit to the UE, an allowed network slice list including only those network slices to which the UE is allowed access.

13. The apparatus of claim 7, wherein the apparatus comprises a network management system executing a plurality of Access and Mobility Management Function (AMF) instances in a 5G wireless communications network.

14. A method, comprising:
  determining, by an Access and Mobility Management Function (AMF) instance executing on a network management system of a 5G communications network, available network slices in the 5G communications network, wherein the AMF instance includes instructions to:

perform an identity status check of a user equipment (UE), during a registration procedure, wherein the identity status check compares a UE permanent equipment identifier (PEI) with a mapped PEI in a subscription permanent identifier (SUPI) of a requested network slice in a plurality of network slices, wherein the identity status check is performed on a local equipment identity register (EIR) database of the network management system, and allow access to the plurality of network slices if the UE PEI matches the mapped PEI in the SUPI;

receiving at the AMF instance, from the UE, a list comprising a plurality of requested network slices of the 5G communications network to which the UE seeks access;

determining by the AMF, in conjunction with a locally implemented network slice control function instance executing on the network management system, whether the UE is subscribed to any network slice identified in the list of requested network slices based on at least UE identifier information specific to the UE;

determining by the AMF, if a common subset of one or more network slices exists between the available network slices, the plurality of requested network slices, and any network slice to which the UE is subscribed; and in response to a determination that a common subset of one or more network slices exists, returning by the AMF to the UE, an indication of the common subset of the one or more network slices facilitating access by the UE to the one or more network slices.

15. The method of claim 14, wherein the locally implemented network slice control function comprises the EIR database, the EIR database comprising a cached copy of at least one of per-network slice access control policies, a per-network slice device allow list, a per-network slice device deny list; and a UE identifier information-to-UE subscriber information mapping, the UE identifier information comprising one of International Mobile Equipment Identity or Permanent Equipment Identifier information, the UE subscriber information comprising one of Subscription Permanent Identifier (SUPI) or International Mobile Subscriber Identity (IMSI) information.

* * * * *